Patented Apr. 28, 1925.

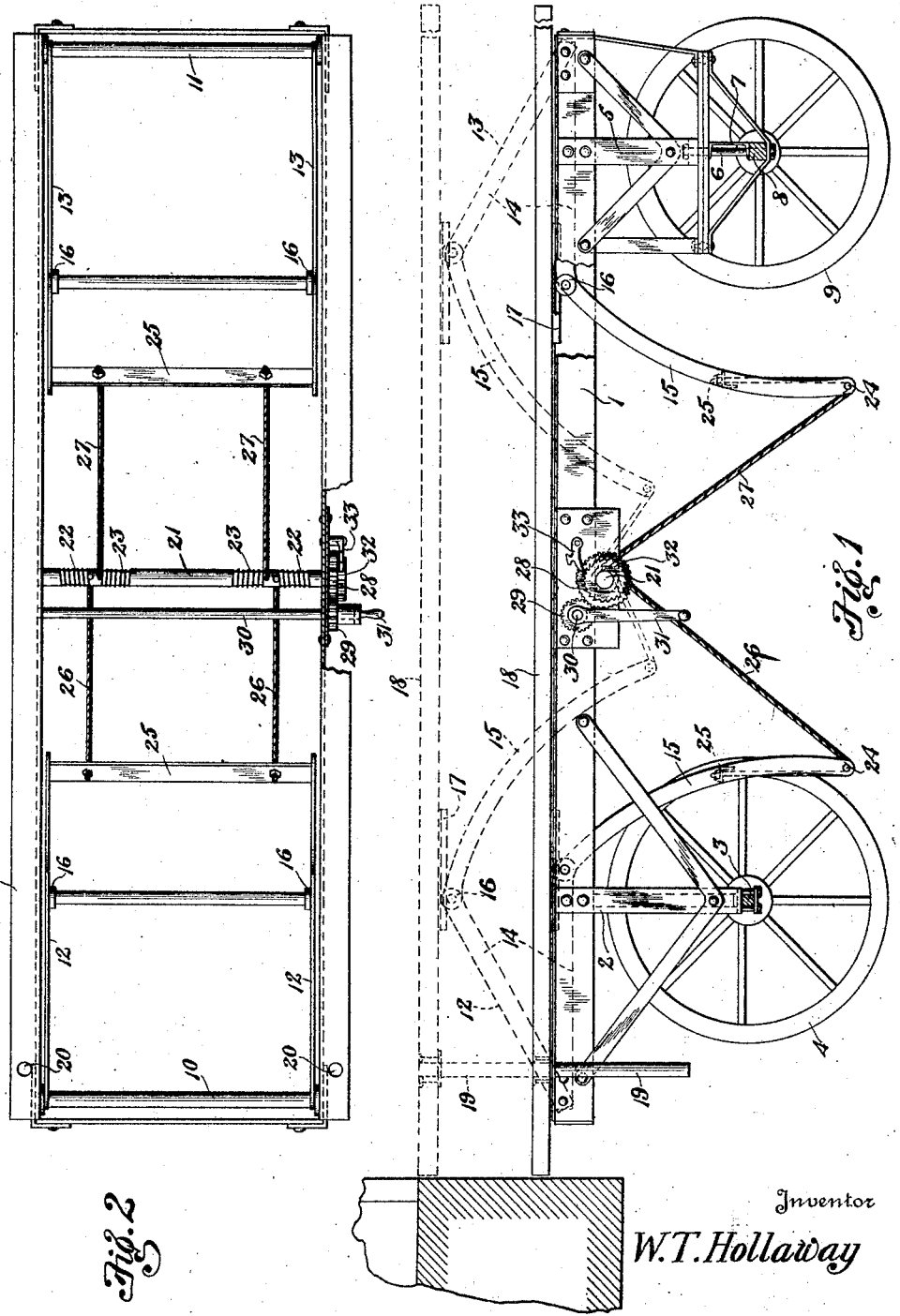

1,535,775

UNITED STATES PATENT OFFICE.

WILLIAM T. HOLLAWAY, OF ALLIANCE, OHIO, ASSIGNOR OF ONE-HALF TO HAROLD A. SIMMS, SR., OF CHICAGO, ILLINOIS, AND WALTER A. McCULLOUGH, OF ALLIANCE, OHIO.

LOADING AND UNLOADING TRUCK.

Application filed March 24, 1923. Serial No. 627,376.

*To all whom it may concern:*

Be it known that I, WILLIAM T. HOLLAWAY, a citizen of the United States, residing at Alliance, in the county of Stark and State of Ohio, have invented certain new and useful Improvements in Loading and Unloading Trucks, of which the following is a specification.

This invention relates to improvements in loading and unloading trucks, such as are used for loading express or baggage in railway cars or removing the same therefrom.

The objects of the invention are to provide a truck which will greatly facilitate the handling of merchandise and materials and effect a saving of time in loading or unloading a car; to provide means for quickly and readily raising the platform of the truck to the level of the car to be loaded or unloaded; and to generally improve and simplify trucks of this character.

The above and other objects may be attained by constructing the truck in the manner illustrated in the accompanying drawing, in which—

Figure 1 is a side elevation of a truck embodying the invention; and

Fig. 2, a top plan view of the truck frame, the platform being removed to illustrate the mechanism.

Similar numerals of reference indicate corresponding parts throughout the drawing.

The body portion of the truck comprises a rectangular frame 1 from the rear portion of which a bolster 2 depends, the bolster being supported upon the axle 3 upon which are mounted the rear wheels 4. A body bolster 5 depends from the front portion of the frame and is pivotally connected by means of the king bolt 6 with the axle bolster 7 which is inserted upon the front axle 8, the front wheels 9 being mounted thereon. A tongue or other means for drawing the truck may be connected to the axle bolster in the usual manner.

A shaft 10 is mounted transversely through the rear portion of the frame and a similar shaft 11 is mounted in the forward portion thereof. Similar pairs of spaced levers 12 and 13 are pivoted at their outer ends upon the shafts 10 and 11 respectively, each lever being provided with a normally horizontal portion 14 and a downwardly bent or curved portion 15.

Each lever 12 and 13 is provided with a roller 16 at the point where the lever is bent, these rollers engaging grooved plates 17 upon the under side of the platform 18 which is loosely mounted upon the frame and provided with the depending guide rods 19 which are slidably mounted through suitable guide openings 20 in the frame 1, thus preventing horizontal movement of the platform relative to the frame.

A drum 21 is journaled transversely through the central portion of the frame and provided with the spiral grooves 22 at its outer end portions and the similar and oppositely disposed grooves 23 intermediate the end portions. The lower ends of each pair of levers 12 and 13 are connected together as by a brace rod 24 and an angle bar 25 is located between each pair of levers near the lower ends thereof.

A cable 26 is connected to each end portion of the angle bar 25 upon the levers 12, said cables extending down beneath the adjacent brace bar 24 and upward to the drum 21, being arranged to wind upon the grooved portions 22 of the drum.

Similar cables 27 are connected to the angle bar 25 of the levers 13 and to the drum 21, being arranged to wind upon the grooved portions 23 of the drum.

A gear 28 is fixed upon one end of the drum 21 and meshes with a comparatively small pinion 29 mounted upon a countershaft 30, a hand crank or the like as shown at 31 being mounted upon the shaft 30.

A ratchet 32 may be fixed at any convenient point upon the drum 21 and engaged by a pawl 33 mounted upon any permanent portion of the frame and arranged to normally engage the ratchet by gravity.

In operation, the material to be loaded into the car is placed upon the platform and the truck moved into the desired position adjacent to the car door. The crank 31 is then turned, winding the cables 26 and 27 upon the drum 21, raising the levers 12 and 13 as shown in dotted lines in Fig. 1, the rollers 16 upon the levers rolling through the grooves in the plates 17 and raising the platform 18 to the desired height, the ratchet 32 being engaged by the pawl 33 to hold the platform in any desired position.

Although the drawings and above specification disclose the best mode in which I have contemplated embodying my invention, I desire to be not limited to the details of such disclosure, for, in the further practical application of my invention, many changes in form and construction may be made, as circumstances require or experience suggests, without departing from the spirit of the invention, within the scope of the appended claims.

I claim:—

1. A loading and unloading truck, including a body, a platform, a pair of angular levers pivoted near each end of the body, a roller journaled at the angular portion of each lever and engaging the under side of the platform, a drum journaled through the body, cables connected to the lower ends of the levers and wound upon the drum, means for rotating the drum and means for holding the drum in any desired position.

2. A loading and unloading truck, including a body, a platform, a pair of angular levers pivoted near each end of the body, a roller journaled at the angular portion of each lever, grooved plates upon the under side of the platform engaged by said rollers, a drum journaled through the body, cables connected to the lower ends of the levers and wound upon the drum, means for rotating the drum and means for holding the drum in any desired position.

3. The combination with a supporting frame and a load supporting platform located above said supporting frame, of means for raising said platform from and lowering it toward said supporting frame comprising a transversely extending shaft adjacent each end of said supporting frame, a transversely extending winding shaft carried by said supporting frame intermediate said first-named shafts, a pair of levers at each end of said supporting frame having their outer ends mounted on said first-named shafts and their inner ends extending toward said winding shaft, said levers being curved upwardly, rollers mounted on said levers and engaging said load supporting platform, flexible cables each having one end secured to the inner end of one of said levers, the other ends of said cables being secured to said winding shaft, and means for turning said winding shaft.

4. The combination with a supporting frame and a load supporting platform located above said supporting frame, of means for raising said platform from and lowering it toward said supporting frame comprising a pair of levers pivotally mounted adjacent each end of said supporting frame, rollers intermediate the ends of said levers for engaging said load supporting platform, and means for turning said levers about their pivot points.

5. A loading and unloading truck, including a body, a platform, a pair of angular levers pivoted near each end of the body, a roller journaled at the angular portion of each lever and engaging the under side of the platform, a drum journaled through the body, cables connected to the lower ends of the levers and wound upon the drum, means for rotating the drum and for holding the drum in any desired position.

In testimony that I claim the above, I have hereunto subscribed my name.

WILLIAM T. HOLLAWAY.